US009197871B2

(12) United States Patent
Shoyama

(10) Patent No.: US 9,197,871 B2
(45) Date of Patent: Nov. 24, 2015

(54) SIGNAL PROCESSING DEVICE WITH PIXEL CORRECTION, SIGNAL PROCESSING METHOD, PROGRAM SOLID-STATE IMAGE SENSOR, AND ELECTRONIC APPARATUS

(71) Applicant: Sony Corporation, Tokyo (JP)

(72) Inventor: Hideki Shoyama, Fukuoka (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 13/920,609

(22) Filed: Jun. 18, 2013

(65) Prior Publication Data
US 2014/0002698 A1 Jan. 2, 2014

(30) Foreign Application Priority Data

Jul. 2, 2012 (JP) .................. 2012-148608

(51) Int. Cl.
H04N 9/64 (2006.01)
H04N 9/04 (2006.01)
H04N 5/367 (2011.01)

(52) U.S. Cl.
CPC ............... H04N 9/646 (2013.01); H04N 5/367 (2013.01); H04N 9/045 (2013.01)

(58) Field of Classification Search
CPC ..................................... H04N 5/367

USPC ....................... 348/222.1, 246, 276
See application file for complete search history.

(56) References Cited

U.S. PATENT DOCUMENTS

| 7,286,179 | B2* | 10/2007 | Chen et al. ..................... 348/346 |
| 2004/0028271 | A1* | 2/2004 | Pollard et al. ................. 382/162 |
| 2005/0286797 | A1* | 12/2005 | Hayaishi ....................... 348/246 |
| 2006/0044425 | A1* | 3/2006 | Yeung et al. .................. 348/246 |
| 2012/0281123 | A1* | 11/2012 | Hoda et al. .................... 348/246 |

FOREIGN PATENT DOCUMENTS

JP 2003-158744 5/2003

* cited by examiner

Primary Examiner — Gevell Selby
(74) Attorney, Agent, or Firm — Dentons US LLP

(57) ABSTRACT

There is provided a signal processing device including a correction processing unit that acquires a pixel signal output from a sensor on which pixels are disposed in an array in which a spatial frequency of a color pixel which is a pixel acquiring a color component is lower than a spatial frequency of luminance pixels which are pixels acquiring luminance components, and then corrects the pixel signal output from a defective pixel out of the pixels that the sensor includes. During correction of a pixel signal of the color pixel, the correction processing unit performs correction referring to pixel signals of the luminance pixels having a spatial frequency higher than the spatial frequency of the color pixel.

12 Claims, 11 Drawing Sheets

FIG. 1
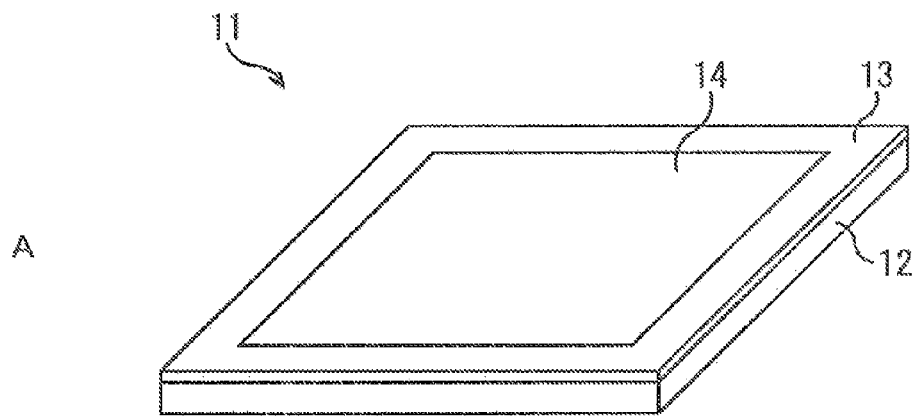
A
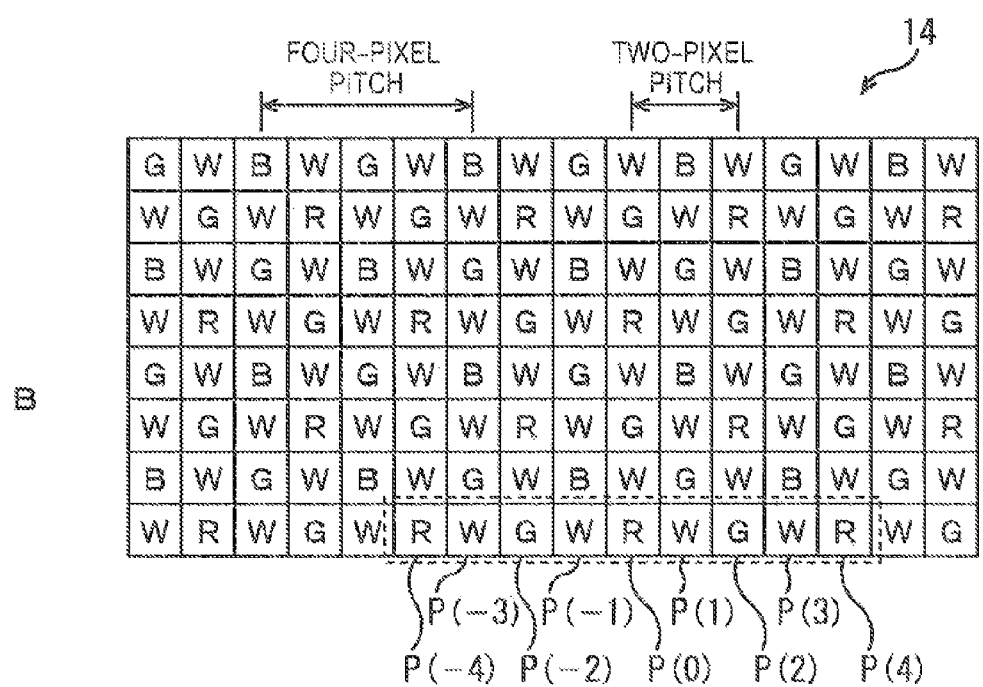
B

FIG. 4
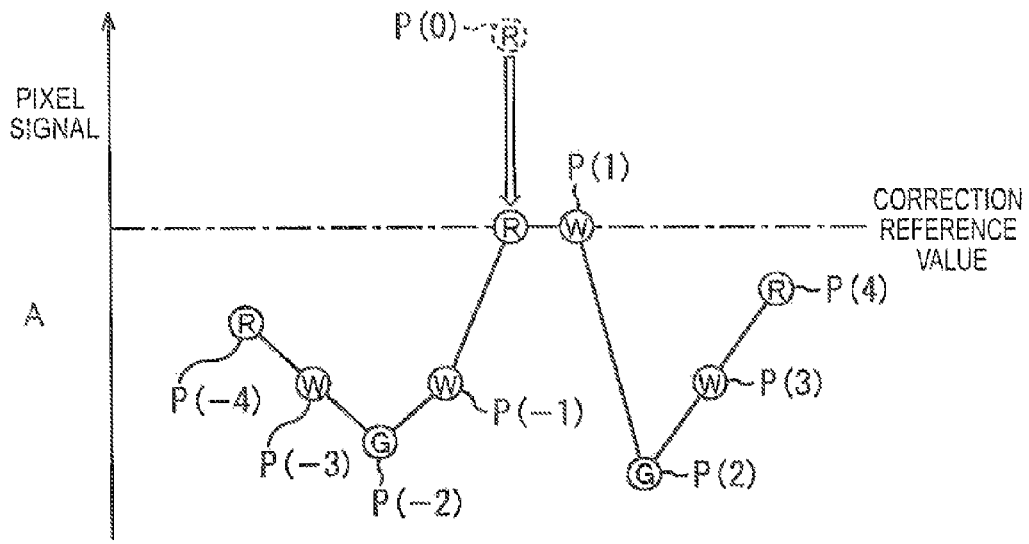
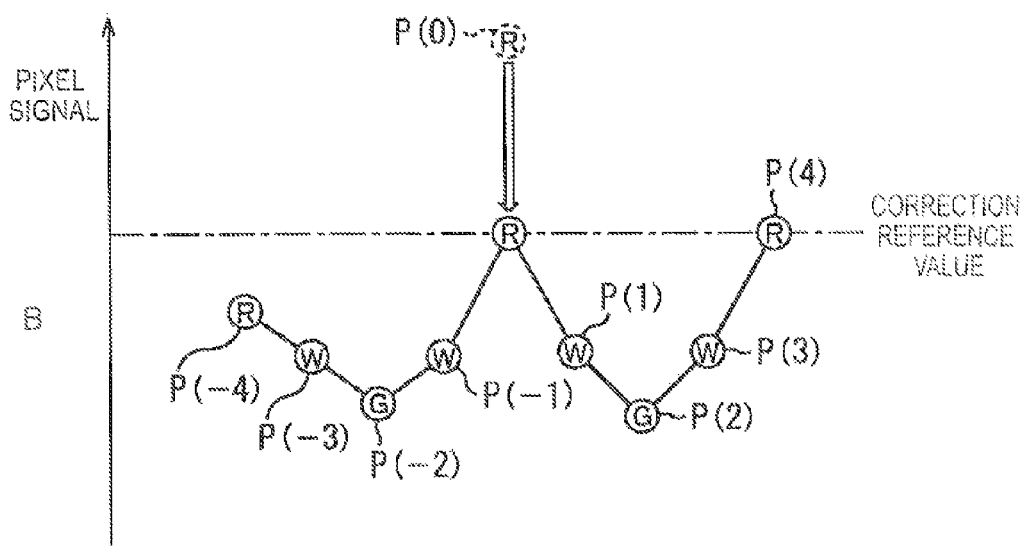

FIG. 8
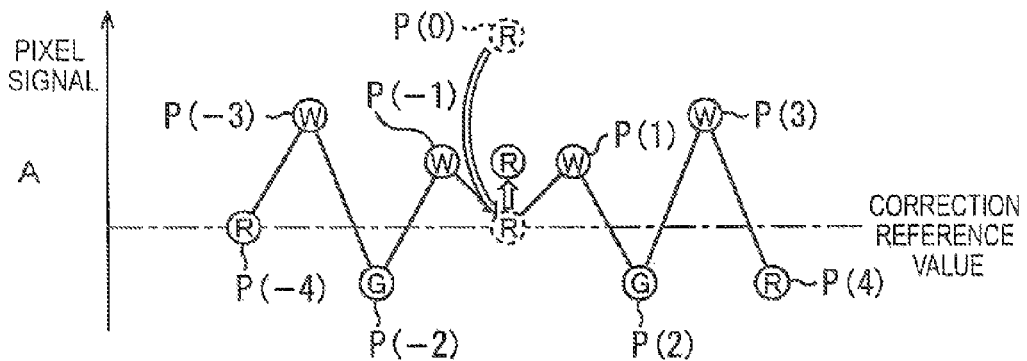
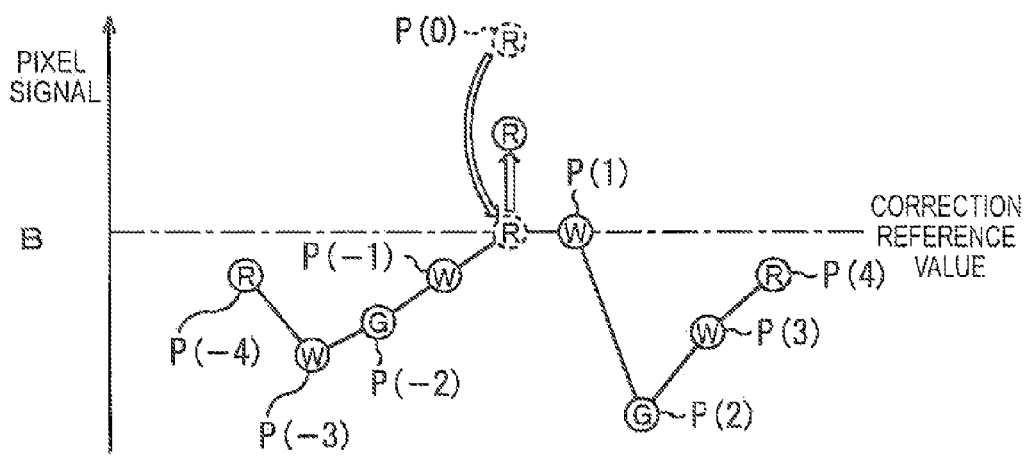
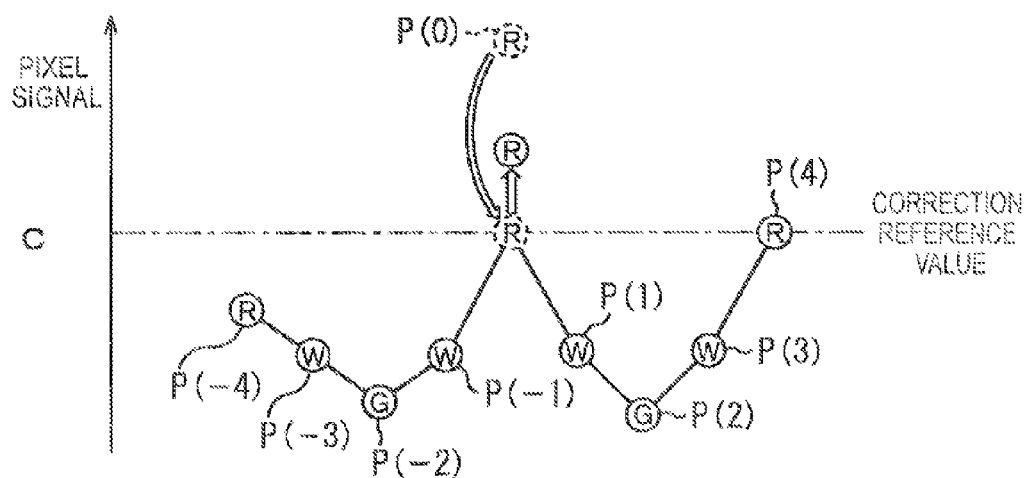

FIG. 10
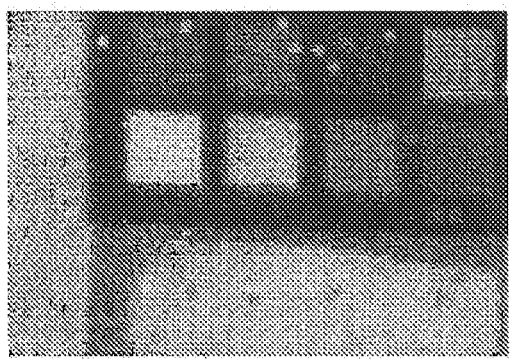
A  IMAGE OBTAINED BY INSERTING FALSE DEFECT INTO ORIGINAL IMAGE
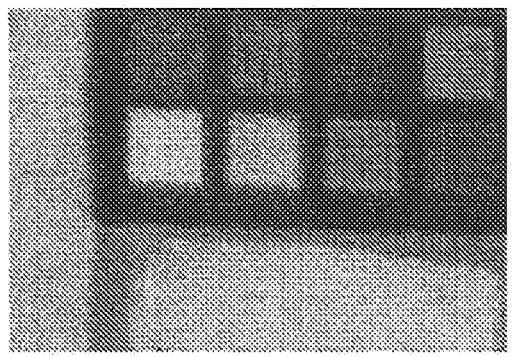
B  IMAGE TO WHICH DEFECT CORRECTION PROCESS OF RELATED ART IS APPLIED
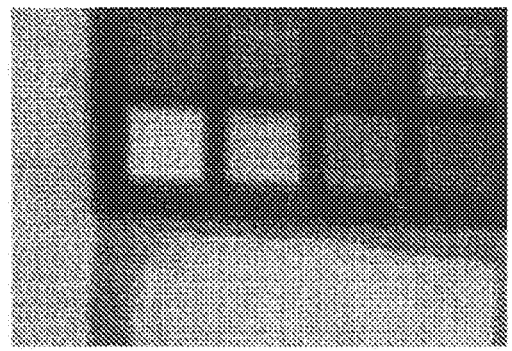
C  IMAGE TO WHICH PRESENT DEFECT CORRECTION PROCESS IS APPLIED

SIGNAL PROCESSING DEVICE WITH PIXEL CORRECTION, SIGNAL PROCESSING METHOD, PROGRAM SOLID-STATE IMAGE SENSOR, AND ELECTRONIC APPARATUS

BACKGROUND

The present disclosure relates to a signal processing device, a signal processing method, a program, a solid-state image sensor, and an electronic apparatus, and particularly to a signal processing device, a signal processing method, a program, a solid-state image sensor, and an electronic apparatus that are designed to enable acquisition of images in which deterioration of quality is suppressed.

In the related art, a color filter with a pixel array in which colors are arranged at equal intervals, such as so-called Bayer array, has been employed in a solid-state image sensor such as a CCD (Charge Coupled Device) sensor, or a CMOS (Complementary Metal Oxide Semiconductor) sensor.

In addition, there are cases in which pixels included in a solid-state image sensor include a defective pixel that generates a pixel signal irrelevant to the amount of incident light, and thus a defect correcting process for correcting such a pixel signal of the defective pixel is generally performed. In the defect correction process of the related art, a process suitable for pixel arrangement in which colors are arranged at equal intervals is performed.

For example, Japanese Unexamined Patent Application Publication No. 2003-158744 discloses a technology for correcting defects using a defective pixel and an arrangement in which the defective pixel is disposed adjacent to pixels having a same color used in defect correction.

SUMMARY

Meanwhile, color filters using white that serves as the main component of a luminance signal in order to attain high sensitivity have been proposed in recent years, and among such color filters, there is one with a pixel arrangement in which red and blue pixels are disposed at a pitch of 4 pixels or more. Even when the defect correction process of the related art is applied to an image captured using a solid-state image sensor that adopts such a color filter with the pixel arrangement, the effect thereof is not satisfactorily exhibited, and it is difficult to suppress deterioration in image quality attributable to a defective pixel.

It is desirable to enable acquisition of images of which deterioration in quality is suppressed.

According to an embodiment of the present disclosure, there is provided a signal processing device including a correction processing unit that acquires a pixel signal output from a sensor on which pixels are disposed in an array in which a spatial frequency of a color pixel which is a pixel acquiring a color component is lower than a spatial frequency of luminance pixels which are pixels acquiring luminance components, and then corrects the pixel signal output from a defective pixel out of the pixels that the sensor includes. During correction of a pixel signal of the color pixel, the correction processing unit performs correction referring to pixel signals of the luminance pixels having a spatial frequency higher than the spatial frequency of the color pixel.

According to an embodiment of the present disclosure, there is provided a signal processing method including acquiring a pixel signal output from a sensor on which pixels are disposed in a manner that a spatial frequency of a color pixel which is a pixel acquiring a color information component is lower than a spatial frequency of luminance pixels which are pixels acquiring main components of luminance signals, and then correcting the pixel signal output from a defective pixel out of the pixels that the sensor includes. During correction of a pixel signal of the color pixel, correction is performed referring to pixel signals of the luminance pixels having a spatial frequency higher than the spatial frequency of the color pixel.

According to an embodiment of the present disclosure, there is provided a solid-state image sensor including a sensor on which pixels are disposed in an array in which a spatial frequency of a color pixel which is a pixel acquiring a color component is lower than a spatial frequency of luminance pixels which are pixels acquiring luminance components, and a correction processing unit that acquires a pixel signal output from the sensor, and then corrects the pixel signal output from a defective pixel out of the pixels that the sensor includes. During correction of a pixel signal of the color pixel, the correction processing unit performs correction referring to pixel signals of the luminance pixels having a spatial frequency higher than the spatial frequency of the color pixel.

According to an embodiment of the present disclosure, there is provided an electronic apparatus including a solid-state image sensor including a sensor on which pixels are disposed in an array in which a spatial frequency of a color pixel which is a pixel acquiring a color component is lower than a spatial frequency of luminance pixels which are pixels acquiring luminance components, and a correction processing unit that acquires a pixel signal output from the sensor, and then corrects the pixel signal output from a defective pixel out of the pixels that the sensor includes. During correction of a pixel signal of the color pixel, the correction processing unit performs correction referring to pixel signals of the luminance pixels having a spatial frequency higher than the spatial frequency of the color pixel.

According to an embodiment of the present disclosure, a pixel signal is acquired, the pixel signal being output from a sensor on which pixels are disposed in a manner that a spatial frequency of a color pixel which is a pixel acquiring a color component is lower than a spatial frequency of luminance pixels which are pixels acquiring luminance components, and then the pixel signal is corrected, the pixel signal being output from a defective pixel out of the pixels that the sensor includes. During correction of a pixel signal of the color pixel, pixel signals of the luminance pixels having a spatial frequency higher than the spatial frequency of the color pixel are referred to.

According to the embodiments of the present disclosure described above, it is possible to acquire images in which deterioration of quality is suppressed.

BRIEF DESCRIPTION OF THE DRAWINGS

FIGS. 1A and 1B are diagrams showing a configuration example of an embodiment of a solid-state image sensor to which the present technology is applied;

FIGS. 4A and 4B are diagrams for describing a correction reference value;

FIGS. 8A to 8C are diagrams for describing a defect correction value;

FIGS. 10A to 10C are diagrams showing an effect of a defect correction process.

DETAILED DESCRIPTION OF THE EMBODIMENT(S)

Figure 2:
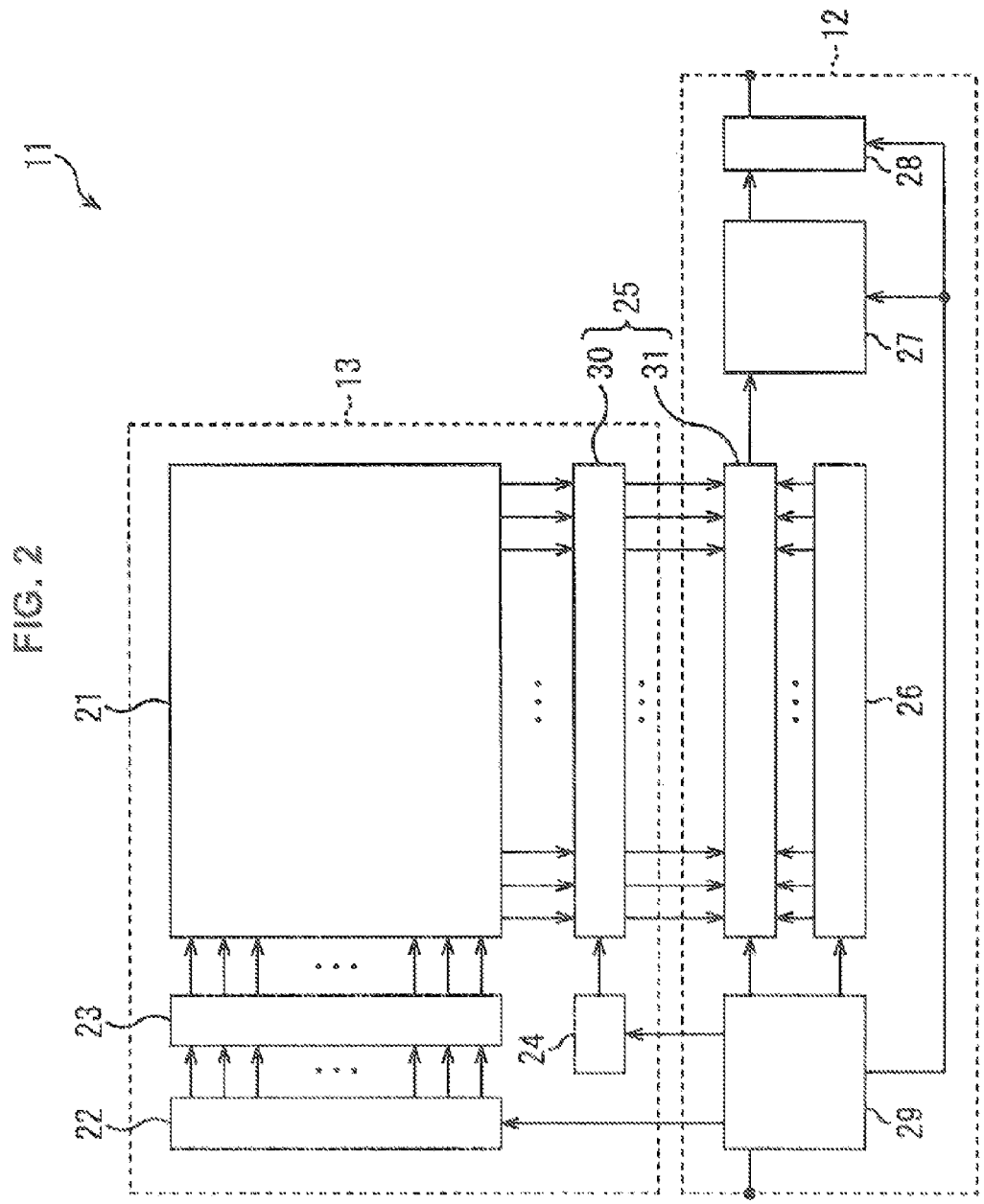
FIG. 2 is a block diagram showing a configuration example of the solid-state image sensor.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

FIGS. 1A and 1B are diagrams showing a configuration example of an embodiment of a solid-state image sensor to which the present technology is applied.

FIG. 1A shows a perspective diagram of a solid-state image sensor, and FIG. 1B shows an example of a color array of a color filter included in the solid-state image sensor.

As shown in FIG. 1A, the solid-state image sensor 11 is configured such that a logic substrate 12 on which a digital circuit is mounted is bonded to a sensor substrate 13 on which an analog circuit is mounted so as to be laminated, and a color filter 14 is disposed on the light sensing surface side of the sensor substrate 13. The logic substrate 12 and the sensor substrate 13 are laminated together after they are each formed as independent chips, and the solid-state image sensor 11 configured as described above is disclosed in detail in, for example, Japanese Unexamined Patent Application Publication No. 2011-159958 filed by the present applicant.

As shown in FIG. 1B, the color filter 14 is configured to have a white (W) filter for obtaining a luminance component in addition to filters of the three primary colors red (R), green (G), and blue (B), different from the so-called Bayer array.

The solid-state image sensor 11 adopts the color filter 14 in which, for example, white pixels (luminance pixels) for acquiring luminance components are arranged in a checkered pattern, and red, green, and blue pixels (color pixels) for acquiring color components are disposed in other portions. In the color filter 14, while the white pixels are disposed at a two-pixel pitch in the horizontal and vertical directions, the red, green, and blue pixels are disposed at a four-pixel pitch in the horizontal and vertical directions. In other words, in the color filter 14, pixels are disposed in a pixel arrangement in which a spatial frequency of the white pixels is high, and a spatial frequency of the red, green, and blue pixels is low.

It should be noted that the color array of the color filter 14 is not limited to the color array of FIG. 1B, and various kinds of color arrays can be adopted as disclosed in Japanese Unexamined Patent Application Publication No. 2011-091849 filed by the present applicant. Instead of using white pixels to acquire luminance components, for example, green pixels may be used to acquire luminance components, and in such a case, the green pixels are disposed in the locations of the white pixels in FIG. 1B.

In addition, as will be described later, in the solid-state image sensor 11, a defect correction process is performed with reference to pixel signals of pixels disposed in a line in the horizontal direction within a predetermined range from a pixel to be processed. For example, as shown in FIG. 1B, when a red pixel P(0) is to be processed in a defect correction process, nine pixel signals from the pixel P(−4) to the pixel P(4) disposed within the range of a four-pixel pitch from the pixel P(0) in the horizontal direction are referred to. Here, a white pixel (for example, in the example of FIG. 1B, the pixel P(−3), the pixel P(−1), the pixel P(1), and the pixel P(3)) which is disposed at a narrower pixel pitch than the red, green, and blue pixels is appropriately referred to hereinafter as a high frequency detection pixel. In addition, a pixel that is located at a four-pixel pitch from a pixel to be processed and has the same color as the pixel to be processed (for example, in the example of FIG. 1B, the pixel P(−4) and the pixel P(4)) is appropriately referred to hereinafter as a nearest same-color pixel.

Next, FIG. 2 is a block diagram showing a configuration example of the solid-state image sensor 11.

As shown in FIG. 2, the solid-state image sensor 11 is configured to include a pixel array 21, a vertical decoder 22, a vertical drive circuit 23, a reference signal supply unit 24, a column processing unit 25, a horizontal scanning circuit 26, an image signal processing unit 27, an output unit 28, and a timing control circuit 29.

In addition, the pixel array 21, the vertical decoder 22, the vertical drive circuit 23, and the reference signal supply unit 24 are formed on the sensor substrate 13, and the horizontal scanning circuit 26, the image signal processing unit 27, the output unit 28, and the timing control circuit 29 are formed on the logic substrate 12. Furthermore, the column processing unit 25 includes a comparator 30 and a counter circuit 31, the comparator 30 is formed on the sensor substrate 13, and the counter circuit 31 is formed on the logic substrate 12.

A plurality of pixels are disposed in the pixel array 21 in an array manner, and each of the pixels is connected to the vertical drive circuit 23 via horizontal signal lines, and connected to the comparator 30 of the column processing unit 25 via vertical signal lines. The pixels disposed in the pixel array 21 are driven by lines according to timing signals from the vertical drive circuit 23, and pixel signals of levels according to the amount of sensed light in each pixel are read in the comparator 30 of the column processing unit 25.

The vertical decoder 22 supplies a signal that regulates line pixels reading a pixel signal in the vertical direction to the vertical drive circuit 23 according to a timing signal supplied from the timing control circuit 29. The vertical drive circuit 23 supplies a pulse to pixels in the line regulated by the vertical decoder 22 so as to drive the pixels.

The reference signal supply unit 24 generates a reference signal that the comparator 30 of the column processing unit 25 refers to according to a timing signal supplied from the timing control circuit 29 and then supplies the reference signal to the comparator 30. For example, the reference signal supply unit 24 generates, as a reference signal, a signal with a waveform (a so-called RAMP waveform) in which a voltage drops from a predetermined initial voltage with a fixed inclination.

The column processing unit 25 performs a column process for performing an A/D (Analog/Digital) converting process and a CDS (Correlated Double Sampling) process on pixel signals output from each of the pixels of the pixel array 21 via the vertical signal lines for each column. As described above, the column processing unit 25 includes the comparator 30 and the counter circuit 31.

The comparator 30 compares the pixel signals supplied from the pixels of the pixel array 21 to the reference signal supplied from the reference signal supply unit 24, and then outputs a signal for switching counting-up and counting-down of the counter circuit 31 to the counter circuit 31 at a timing when, for example, the reference signal with a waveform in which a voltage drops with a fixed inclination is lower than the pixel signals. Then, the counter circuit 31 counts a clock signal supplied from the timing control circuit 29, and switches counting-up and counting-down based on a signal from the comparator 30 so as to output, for example, a pixel signal of which reset noise or the like is removed.

The horizontal scanning circuit 26 controls the pixel signals from the column processing unit 25 so as to be sequentially output therefrom according to the timing signal supplied from the timing control circuit 29.

The image signal processing unit 27 is configured to include a signal processing circuit, a microprocessor, and a memory, and performs a predetermined signal process on the pixel signals supplied from the counter circuit 31 of the column processing unit 25. For example, the image signal processing unit 27 performs a defect correction process in which pixel signals output from defective pixels among the pixels included in the pixel array 21 on the sensor substrate 13 are corrected. In addition, when the red pixel P(0) is to be processed, the image signal processing unit 27 corrects a pixel signal of the pixel P(0) referring to nine pixel signals from the pixel P(−4) to the pixel P(4) disposed in the range of a four-pixel pitch from the pixel P(0) in the horizontal direction, as shown in FIG. 1B. Note that the defect correction process by the image signal processing unit 27 will be described later referring to FIGS. 3 to 9.

Figure 11:
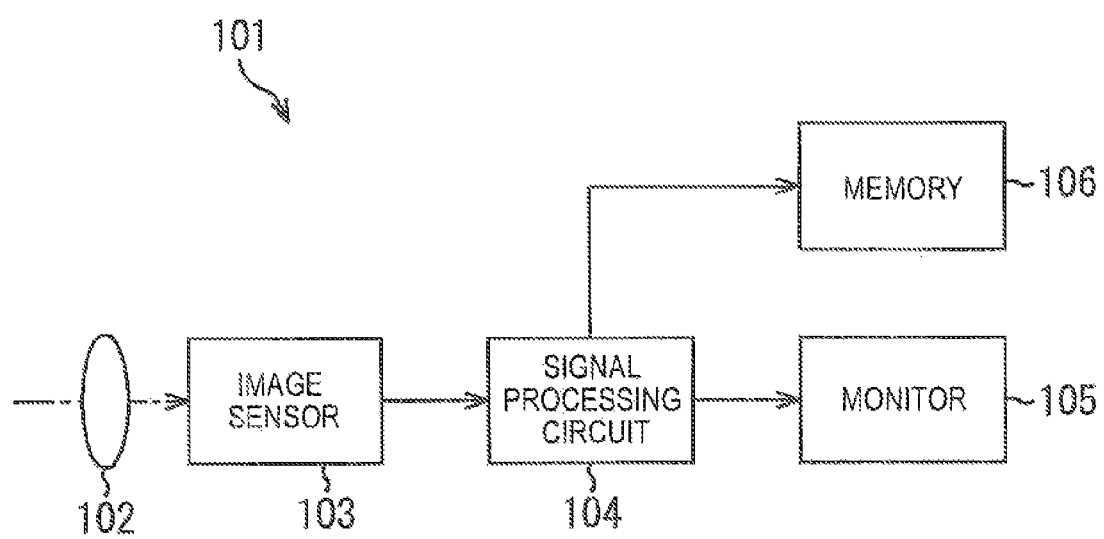
FIG. 11 is a block diagram showing a configuration example of an imaging device mounted on an electronic apparatus.

The output unit 28 amplifies the pixel signals output from the image signal processing unit 27 at a predetermined amplification ratio, and then supplies the signals to a circuit in the latter stage not shown in the drawing (for example, a signal processing circuit 104 of FIG. 11).

The timing control circuit 29 generates a timing signal that serves as a reference of each operation of the units included in the solid-state image sensor 11 based on a master clock supplied from outside, and then supplies the signal to each unit.

Since the solid-state image sensor 11 configured as described above outputs pixel signals that have undergone the defect correction process in the image signal processing unit 27, even if the pixel array 21 includes defective pixels, an image in which deterioration in quality attributable to the defective pixels is suppressed can be captured.

Figure 3:
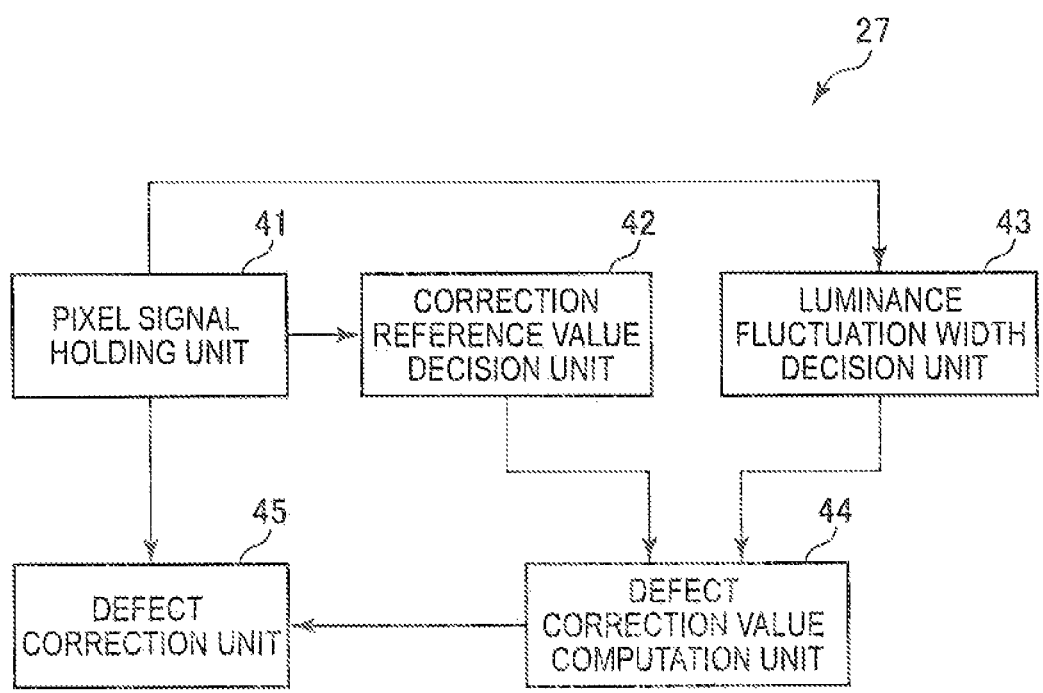
FIG. 3 is a block diagram showing a configuration example of an image signal processing unit.

FIG. 3 is a block diagram showing a configuration example of the image signal processing unit 27.

As shown in FIG. 3, the image signal processing unit 27 is configured to include a pixel signal holding unit 41, a correction reference value decision unit 42, a luminance fluctuation width decision unit 43, a defect correction value computation unit 44, and a defect correction unit 45.

The pixel signal holding unit 41 acquires pixel signals sequentially output from the column processing unit 25, and holds a predetermined number of pixel signals necessary for performing a defect correction process. For example, the pixel signal holding unit 41 holds the pixel signals of a plurality of pixels disposed in a predetermined range from a pixel to be processed in a defect correction process in the horizontal direction. In other words, the pixel signal holding unit 41 holds the nine pixel signals from the pixel P(−4) to the pixel P(4) from the pixel P(0) to be processed in FIG. 1B described above.

The correction reference value decision unit 42 decides a correction reference value that serves as a reference when the pixel signal of a pixel to be processed is corrected based on the pixel signal of a predetermined pixel among the pixel signals held in the pixel signal holding unit 41. Note that a process of deciding a correction reference value will be described later referring to FIGS. 4 to 6.

The luminance fluctuation width decision unit 43 decides a luminance fluctuation width used to avoid correcting of the pixel signal of a pixel that is not a defective pixel. Note that a process of deciding a luminance fluctuation width will be described later referring to FIG. 7.

The defect correction value computation unit 44 computes a defect correction value by adding a luminance fluctuation width decided by the luminance fluctuation width decision unit 43 to a correction reference value obtained by the correction reference value decision unit 42.

When the pixel signal of a pixel to be processed has a value exceeding a defect correction value obtained by the defect correction value computation unit 44, the defect correction unit 45 replaces the pixel signal of the pixel to be processed with the defect correction value on the assumption that the pixel to be processed is a defective pixel, and then corrects the pixel signal of the pixel.

Next, a process of deciding a correction reference value by the correction reference value decision unit 42 will be described referring to FIGS. 4A to 6.

FIGS. 4A and 4B show the pixel signals from the pixel P(−4) to the pixel P(4) referred to when defect correction is performed on the pixel P(0) to be processed in accordance with the disposition of the pixels. In other words, with reference to the pixel signal of the pixel P(0) to be processed, the pixel signals from the pixel P(−4) to the pixel P(−1) which are output earlier that of the pixel P(0) to be processed are disposed in order on the left side of the pixel P(0), and the pixel signals from the pixel P(1) to the pixel P(4) which are output later than that of the pixel P(0) are disposed in order on the right side of the pixel P(0).

First, the correction reference value decision unit 42 compares the pixel signals of the pixel P(1) and the pixel P(−1) which are located at a one-pixel pitch from the pixel P(0) among the high frequency detection pixels to the pixel signals of the pixel P(4) and the pixel P(−4) which are the nearest same-color pixels. Then, the correction reference value decision unit 42 decides the maximum value of the compared pixel signals of the pixels as a correction reference value that serves as a reference when the pixel signal of the pixel P(0) to be processed is corrected.

For example, as shown in FIG. 4A, when the pixel signal of the pixel P(1) that is a high frequency detection pixel among the compared pixel signals has a maximum value (maximum luminance value), the correction reference value decision unit 42 sets the pixel signal of the pixel P(1) as a correction reference value. In addition, when the pixel signal of the pixel P(4) that is the nearest same-color pixel among the compared pixel signals has a maximum value as shown in FIG. 4B, the correction reference value decision unit 42 sets the pixel signal of the pixel P(4) as a correction reference value.

Meanwhile, there is a case in which, as the pixel signals of pixels having different colors have different pixel values in each color even for the same texture, when a pixel signal of a pixel having a different color is used as a correction reference value in a completely uniform manner, chroma of the pixel may be lowered. For example, when the pixel signal of a red pixel undergoes a defect correction process with reference to the pixel signal of a white pixel, the chroma of red is lowered.

Figure 5:
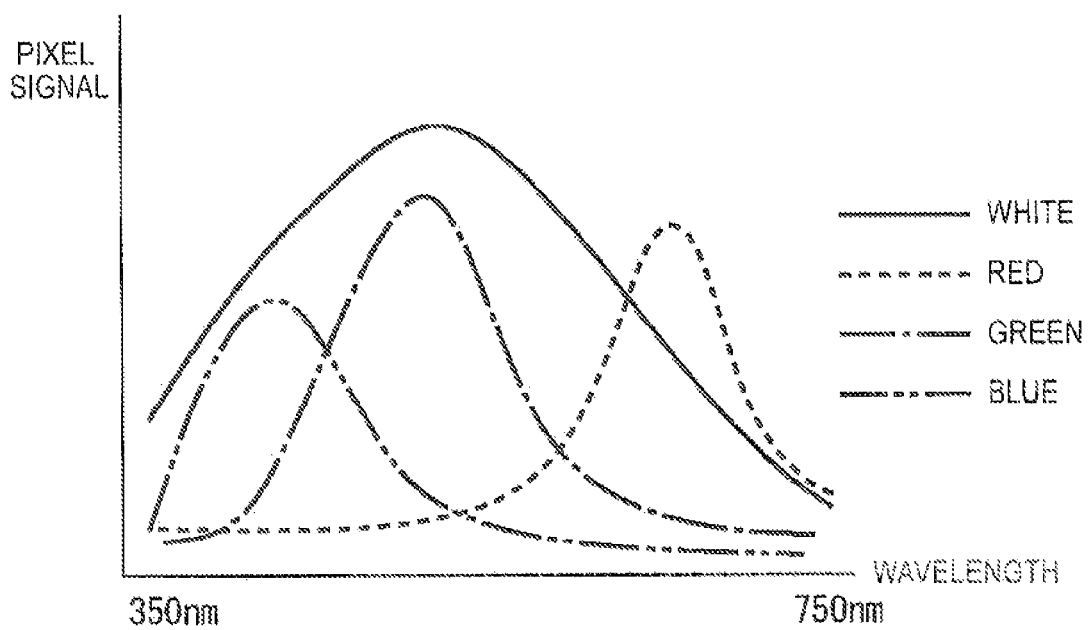
FIG. 5 is a diagram showing spectral characteristics.

In other words, as shown in the spectral characteristic of FIG. 5, the pixel signal of a white pixel drops lower than the pixel signal of a red pixel in a red wavelength region. Thus, based on the judgment that the pixel signal of the red pixel P(0) to be processed exceeds the pixel signal of the white pixel P(1) that has a correction reference value as a maximum luminance value, the pixel P(0) is assumed to be a defective pixel, and accordingly, the pixel signal of the pixel P(0) is corrected. In this case, since the level of the pixel signal of the red pixel P(0) is lowered to that of the pixel signal of the white pixel P(1), as a result of a defect correction process, the chroma of red is assumed to be lowered.

Thus, the correction reference value decision unit 42 decides a maximum value of nearest same-color pixels when the pixel signals of all high frequency detection pixels referred to in a defect correction process exceed the pixel signal of a nearest same-color pixel.

Figure 6:
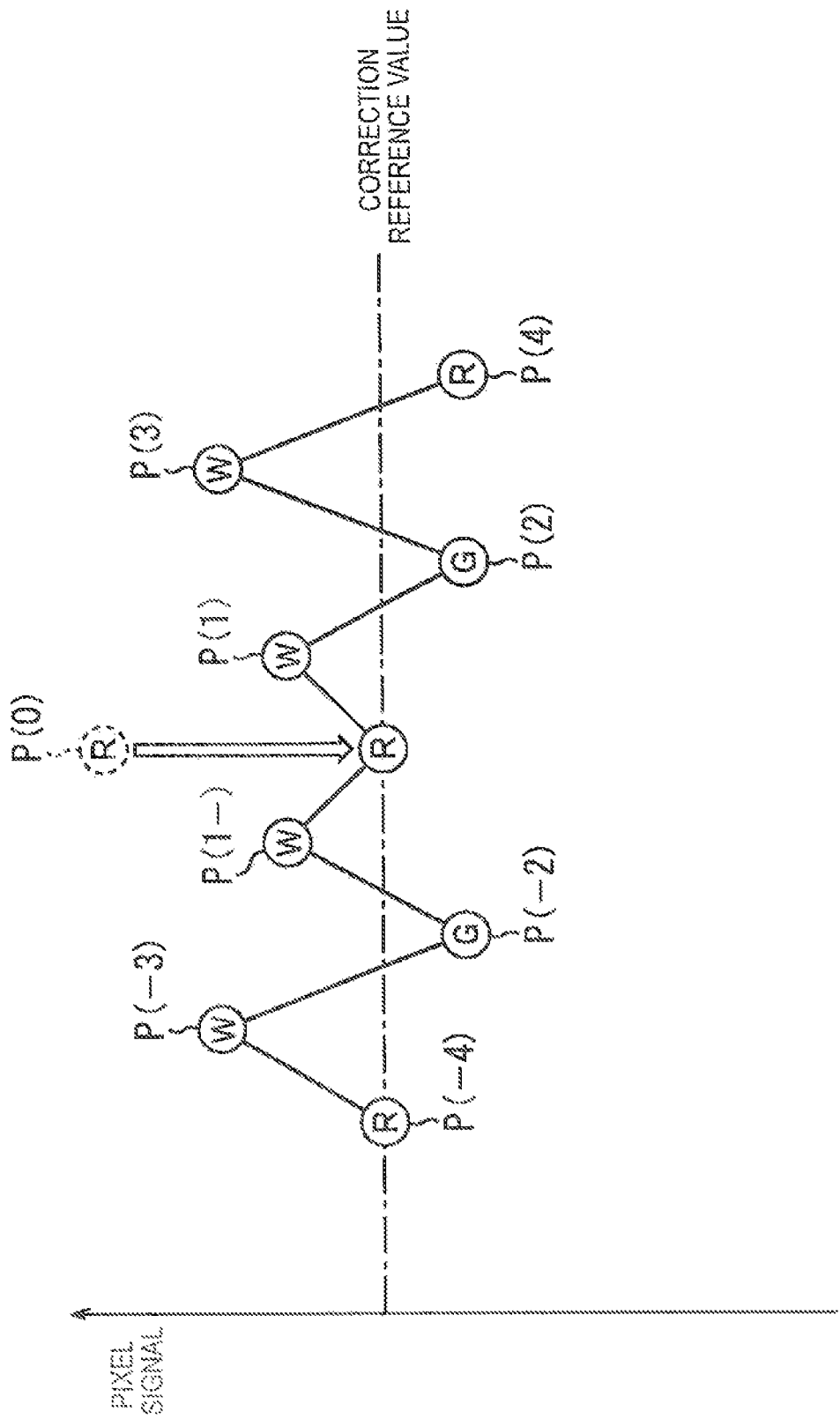
FIG. 6 is a diagram for describing a correction reference value.

For example, FIG. 6 shows an example in which all pixel signals of the pixel P(−3), the pixel P(−1), the pixel P(1) and the pixel P(3) which are high frequency detection pixels exceed the pixel signals of the pixel P(4) and the pixel P(−4) which are nearest same-color pixels. In this case, the correction reference value decision unit 42 decides the pixel signal of the pixel P(−4) that has the maximum value out of the pixels signals of the pixel P(4) and the pixel P(−4) as a correction reference value. By deciding a correction reference value in this manner, it is possible to avoid a decrease in the chroma of the pixel signal of a pixel to be processed as the pixel signal thereof drops to the level of the pixel signal of a pixel having another color due to erroneous detection in a high chromatic region.

As described above, the correction reference value decision unit 42 decides a maximum value of the pixel signal of a high frequency detection pixel located at a one-pixel pitch from the pixel to be processed or of the pixel signal of a nearest same-color pixel as a correction reference value. Alternatively, the correction reference value decision unit 42 decides, as a correction reference value, a maximum value of nearest same-color pixels as a correction reference value when the pixel signals of all high frequency detection pixels referred to in a defect correction process exceed the pixel signal of a nearest same-color pixel.

Figure 7:
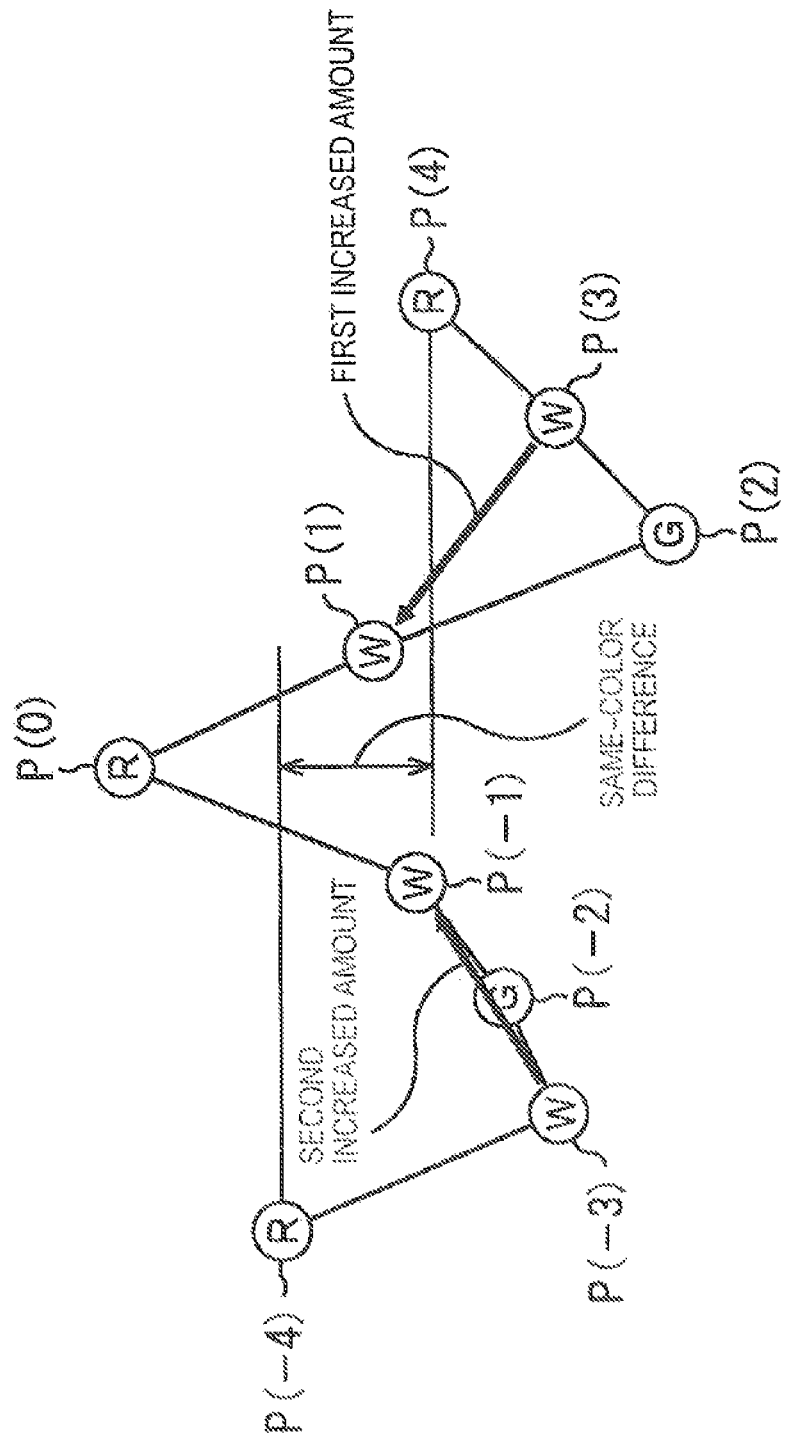
FIG. 7 is a diagram for describing a luminance fluctuation width.

Next, a process of deciding a luminance fluctuation width by the luminance fluctuation width decision unit 43 will be described referring to FIG. 7.

First, the luminance fluctuation width decision unit 43 obtains the absolute value of the difference between the pixel signals of the pixel P(4) and the pixel P(−4) which are nearest same-color pixels as the same-color difference. Furthermore, the luminance fluctuation width decision unit 43 obtains an increment of the pixel signal of the pixel P(1) a one-pixel pitch away from the pixel P(0) to be processed from the pixel signal of the pixel P(3) a three-pixel pitch away from the pixel P(0) to be processed as a first increased amount. In the same manner, the luminance fluctuation width decision unit 43 obtains an increment of the pixel signal of the pixel P(−1) a one-pixel pitch away from the pixel P(0) to be processed from the pixel signal of the pixel P(−3) a three-pixel pitch away from the pixel P(0) to be processed as a second increased amount.

Then, the luminance fluctuation width decision unit 43 decides a maximum value among the same-color difference, the first increased amount, and the second increased amount as a luminance fluctuation width.

For example, when the pixel signal of the pixel to be processed exceeds the correction reference value decided as described above, and correction is performed accordingly, if a high frequency component is included in an image, it is assumed that the pixel signal is corrected even though the pixel to be processed is not a defective pixel. In other words, when a high frequency component is included in an image even though a pixel to be processed is not a defective pixel, the pixel signal thereof has a value exceeding the correction reference value. Thus, by using a luminance fluctuation width decided by the luminance fluctuation width decision unit 43, it is possible to avoid the pixel signal being corrected even though the pixel to be processed is not a defective pixel.

Note that, as a luminance fluctuation width, determination of whether or not a pixel is a defective pixel can be appropriately made according to the level of a direct current component and the amount of noise of peripheral pixel signals, without setting a parameter such as determination allowance, for example, in the formula "maximum value+white blemish determination allowance>data of pixel to be noted>a minimum value−black blemish determination allowance" disclosed in Japanese Unexamined Patent Application Publication No. 2003-158744 by using the increased amounts of the high frequency detection pixels (first and second increased amounts). In addition, by setting the maximum value among the same-color difference, the first increased amount, and the second increased amount as a luminance fluctuation width, the luminance fluctuation width can be effectively decided using a natural law (for example, light shot noise increasing the square root of an amount of light) in a pixel arrangement that has same-colored pixels which are spatially separated.

A defect correction value computed by the defect correction value computation unit 44 will be described referring to FIGS. 8A to 8C.

For example, in the example shown in FIG. 8A, the pixel signal of the pixel P(−4) is set to be a correction reference value, and the same-color difference obtained from the pixel P(4) and the pixel P(−4) is set to be a luminance fluctuation width. Accordingly, the defect correction value computation unit 44 adds the luminance fluctuation width to the pixel signal of the pixel P(−4) that is the correction reference value, and thereby obtains a defect correction value used in correcting the pixel signal of the pixel P(0) when the pixel P(0) to be processed is a defective pixel.

In addition, in the example shown in FIG. 8B, the pixel signal of the pixel P(1) is set to be a correction reference value, and the first increased amount of the pixel P(1) from the pixel P(3) is set to be a luminance fluctuation width. Thus, the defect correction value computation unit 44 adds the luminance fluctuation width to the pixel signal of the pixel P(1) that is the correction reference value, and thereby obtains a defect correction value used in correcting the pixel signal of the pixel P(0) when the pixel P(0) to be processed is a defective pixel.

In addition, in the example shown in FIG. 8C, the pixel signal of the pixel P(4) is set to be a correction reference value, and the same-color difference obtained from the pixel P(4) and the pixel P(−4) is set to be a luminance fluctuation width. Thus, the defect correction value computation unit 44 adds the luminance fluctuation width to the pixel signal of the pixel P(4) that is the correction reference value, and thereby obtains a defect correction value used in correcting the pixel signal of the pixel P(0) when the pixel P(0) to be processed is a defective pixel.

In this manner, when a pixel to be processed is a defective pixel, the defect correction value computation unit 44 obtains a defect correction value used in correcting the pixel signal thereof by adding a luminance fluctuation width decided by the luminance fluctuation width decision unit 43 to a correction reference value decided by the correction reference value decision unit 42. Then, the defect correction unit 45 corrects the pixel signal using such a defect correction value obtained in that manner when the pixel signal of the pixel to be processed exceeds a defect correction value, and does not correct the pixel signal when the pixel signal of the pixel to be processed does not exceed the defect correction value.

Figure 9:
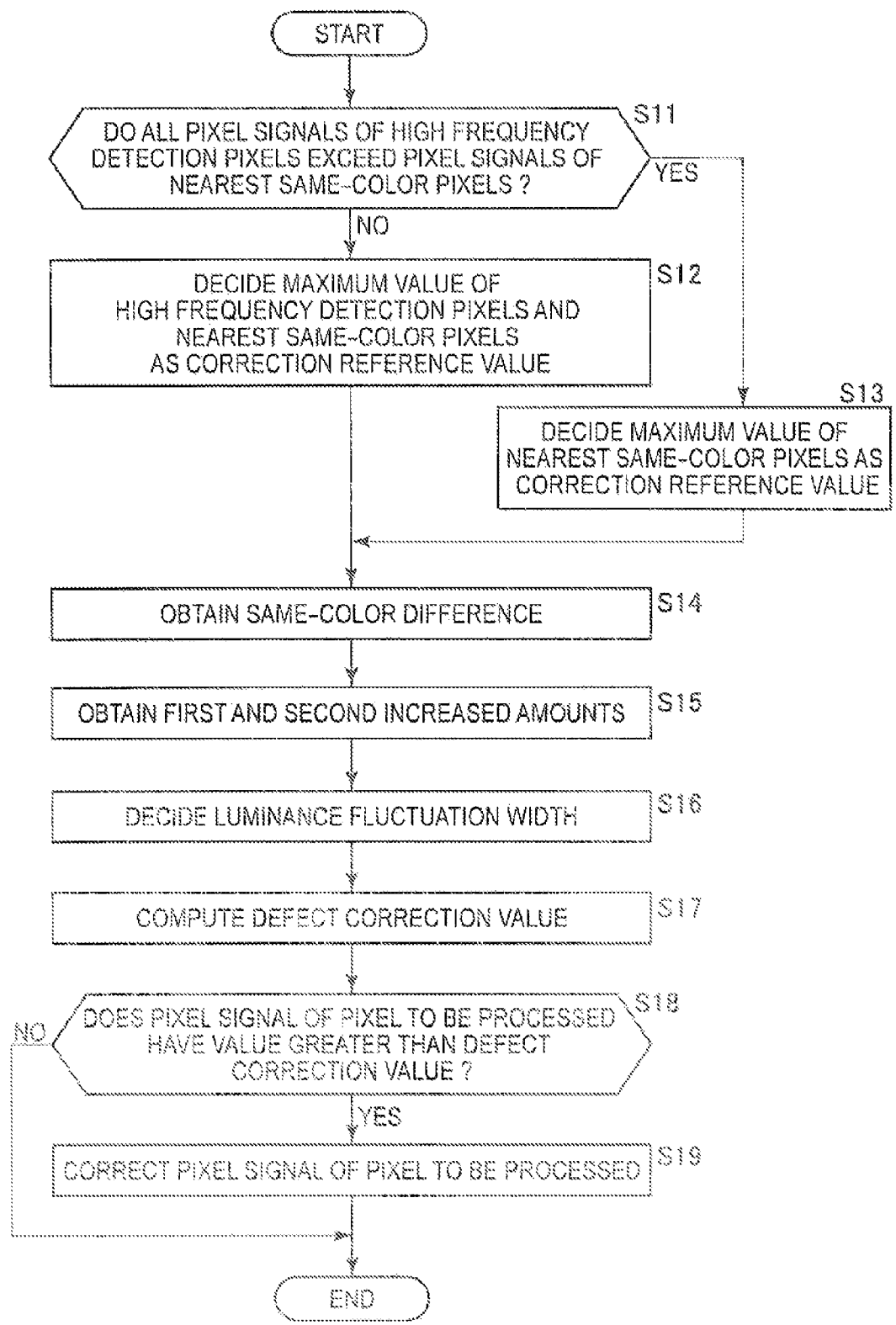
FIG. 9 is a flowchart for describing a defect correction process.

Next, FIG. 9 shows a flowchart for describing a defect correction process performed in the image signal processing unit 27.

The defect correction process is started when, for example, pixel signals are sequentially output from the column processing unit 25, and pixel signals necessary for performing the process, for example the pixel signals from the pixel P(−4) to the pixel P(4) beginning from the pixel P(0) to be processed are held in the pixel signal holding unit 41. In Step S11, the correction reference value decision unit 42 determines whether or not all pixel signals of the high frequency detection pixels exceed the pixel signals of the nearest same-color pixels. In other words, the correction reference value decision unit 42 determines whether or not all pixel signals of the pixel P(−3), the pixel P(−1), the pixel P(1), and the pixel P(3) exceed the pixel signals of the pixel P(4) and the pixel P(−4).

In Step S11, when the correction reference value decision unit 42 determines that not all pixel signals of the high frequency detection pixels exceed the pixel signals of the nearest same-color pixels, in other words, when any one of the pixel signals of the high frequency detection pixels is equal to or lower than the pixel signal of the nearest same-color pixels, the process proceeds to Step S12.

In Step S12, the correction reference value decision unit 42 decides the pixel signal of the pixel P(−1) and the pixel P(1) which are high frequency detection pixels located a one-pixel pitch away from the pixel P(0) and the pixel P(4) and the pixel P(−4) which are the nearest same-color pixels, indicating a maximum value, as a correction reference value.

On the other hand, in Step S11, when the correction reference value decision unit 42 determines that all pixel signals of the high frequency detection pixels exceed the pixel signals of the nearest same-color pixels, the process proceeds to Step S13. In Step S13, the correction reference value decision unit 42 decides the pixel signal of the pixel P(4) and the pixel P(−4) which are the nearest same-color pixels indicating a maximum value as a correction reference value.

After the process of Step S12 or Step S13, the process proceeds to Step S14. The luminance fluctuation width decision unit 43 obtains the absolute value of the difference of the pixel signals of the pixel P(4) and the pixel P(−4) which are the nearest same-color pixels are the same-color difference.

In Step S15, the luminance fluctuation width decision unit 43 obtains the first increased amount that is an increment of the pixel signal of the pixel P(1) from the pixel signal of the pixel P(3) and the second increased amount that is an increment of the pixel signal of the pixel P(−1) from the pixel signal of the pixel P(3).

In Step S16, the luminance fluctuation width decision unit 43 decides a maximum value out of the same-color difference obtained in Step S14 and the first and the second increased amount obtained in Step S15 as a luminance fluctuation width.

In Step S17, the defect correction value computation unit 44 computes a defect correction value by adding the luminance fluctuation width decided in Step S16 to the correction reference value decided in Step S12 or Step S13.

In Step S18, the defect correction unit 45 compares the pixel signal of the pixel P(0) to be processed that is held in the pixel signal holding unit 41 to the defect correction value computed by the defect correction value computation unit 44 in Step S17. Then, the defect correction unit 45 determines whether the pixel signal of the pixel P(0) to be processed has a value greater than the defect correction value.

In Step S18, when the defect correction unit 45 determines that the pixel signal of the pixel P(0) to be processed has a value greater than the defect correction value, the pixel P(0) to be processed is determined to be a defective pixel, and the process proceeds to Step S19.

In Step S19, when the defect correction unit 45 replaces the pixel signal of the pixel P(0) to be processed with the defect correction value computed by the defect correction value computation unit 44 in Step S17, and then corrects the pixel signal of the defective pixel. After the process of Step S19, the defect correction process ends.

On the other hand, when the defect correction unit 45 determines that the pixel signal of the pixel P(0) to be processed does not have a value greater than the defect correction value in Step S18 (in other words, the pixel signal of the pixel P(0) has a value less than the defect correction value), the pixel P(0) to be processed is determined not to be a defective pixel, Step S19 is skipped, and thereby the defect correction process ends.

As described above, in the solid-state image sensor 11, by performing a defect correction process on pixel signals obtained from a pixel arrangement in which spatial frequencies of red, green, and blue pixels are low with reference to high frequency detection signals, defect correction can be performed with higher accuracy without erroneous correction. Accordingly, in the solid-state image sensor 11, more satisfactory images in which deterioration in quality attributable to defective pixels is suppressed can be acquired.

In addition, in the solid-state image sensor 11, a portion in a small area with high luminance, for example, spot-like reflection, or the like, can be determined to have a normal value by referring to high frequency detection pixels, and performing erroneous correction in such a portion can be avoided. In addition, in the solid-state image sensor 11, reduction in chroma can be avoided as described above.

In addition, in the solid-state image sensor 11, since a defect correction process is performed referring to a predetermined number of pixels arranged in a line from a pixel to be processed, highly accurate defect correction can be performed without using line buffering. In other words, while manufacturing cost increases when a memory is mounted in order to retain a number of pixel information pieces in a processing method in which line buffering is used, the solid-state image sensor 11 does not use line buffering, and thereby manufacturing cost thereof can be reduced.

In addition, since it is determined in a defect correction process whether or not correction is performed using a luminance fluctuation width, an appropriate determination can be made according to the level of a direct current component and the amount of noise of pixel signals of pixels in the periphery of a pixel to be processed.

An effect of a defect correction process performed by the image signal processing unit 27 will be described referring to, for example, FIGS. 10A to 10C.

FIG. 10A shows an image obtained by inserting a false defect into an original image having low spatial frequency of red, green, and blue pixels such as an image obtained using the color filter 14 shown in FIGS. 1A and 1B. FIG. 10B shows an image obtained by applying a defect correction process of the related art to the original image of FIG. 10A, and FIG. 10C shows an image obtained by applying the defect correction process described above performed by the image signal processing unit 27 to the original image of FIG. 10A.

As understood from comparison of the image of FIG. 10B to the image of FIG. 10C, the false defect inserted into the original image can be appropriately corrected, and an image having a small amount of residual correction can be obtained by applying the defect correction process described above performed by the image signal processing unit 27.

It should be noted that the present embodiment describes the example in which the correction reference value decision unit 42 decides a correction reference value from the pixel signals of the pixel P(1) and the pixel P(−1) located one pixel away from the pixel P(0)among the high frequency detection pixels. With regard to this, the correction reference value decision unit 42 may decide a correction reference value from, for example, the high frequency detection pixels disposed between the pixel P(4) and the pixel P(−4) which are the nearest same-color pixels from the pixel P(0) in addition to the pixel P(1) and the pixel P(−1). For example, high frequency detection pixels used to decide a correction reference value can be changed according to an MTF (Modulation Transfer Function) corresponding to the pixel array thereof It should be noted that more preferable effect can be obtained by using high frequency detection pixels disposed as close as possible to the pixel P(0).

In addition, in the solid-state image sensor 11, it is possible to perform the defect correction process on all pixels disposed in the pixel array 21 in order, and to perform the defect correction process only on defective pixels. In other words, when a pixel having a defect is specified in examination performed during manufacturing of the solid-state image sensor 11, for example, the address of the defective pixel is set in the image signal processing unit 27, and then the defect correction process can be performed only on pixel signals output from the address. Accordingly, it is possible to avoid erroneously performing the defect correction process on pixels other than a defective pixel, and thereby enhancement in processing speed, low power consumption, and the like can be achieved.

It should be noted that each process described referring to the flowchart above includes a process that is not necessarily performed in a time series manner in the order described in the flowchart, but may be performed in a parallel or individual manner (for example, a paralleled process or a process by objects). In addition, the program may be processed by one CPU, or processed by a plurality of CPUs in a distributed manner.

In addition, the solid-state image sensor 11 as described above can be applied to various kinds of electronic apparatuses, for example, an imaging system including a digital still camera, a digital video camera, and the like, a mobile telephone with an imaging function, and other devices with an imaging function.

FIG. 11 is a block diagram showing a configuration example of an imaging device mounted on an electronic apparatus.

As shown in FIG. 11, the imaging device 101 is configured to include an optical system 102, an image sensor 103, a signal processing circuit 104, a monitor 105, and a memory 106, and can capture still images and moving images.

The optical system 102 is configured to have one or more lenses, and guides image light (incident light) from a subject to form an image on a light sensing face (sensor unit) of the image sensor 103.

As the image sensor 103, the solid-state image sensor 11 of the above-described configuration example is applied. In the image sensor 103, electrons are accumulated for a fixed period of time according to images formed on the light sensing face via the optical system 102. Then a signal is supplied to the signal processing circuit 104 according to the electrons accumulated in the image sensor 103.

The signal processing circuit 104 performs various signal processes on pixel signals output from the image sensor 103. An image (image data) obtained by the signal processing circuit 104 performing a signal process is supplied to the monitor 105 so to be displayed, or supplied to the memory 106 so as to be stored (recorded).

By applying the solid-state image sensor 11 of the above-described configuration example to the imaging device 101 configured as described above as the image sensor 103, an image in which deterioration in quality attributable to a defective pixel is suppressed can be acquired.

It should be noted that the signal processing circuit 104 may output pixel signals that have undergone the defect correction process in the solid-state image sensor 11, or, for example, may perform the above-described defect correction process on pixel signals output without undergoing the defect correction process in the solid-state image sensor 11. In addition, the above-described defect correction process may be performed by outputting pixel signals (raw data) output from the pixel array 21 of the sensor substrate 13 as they are and then executing a program, for example, on a personal computer, or the like on the pixel signals. Even in such a case, the same effect as when the defect correction process is performed in the solid-state image sensor 11 can be obtained.

Additionally, the present technology may also be configured as below.

(1) A signal processing device including:
   a correction processing unit that acquires a pixel signal output from a sensor on which pixels are disposed in an array in which a spatial frequency of a color pixel which is a pixel acquiring a color component is lower than a spatial frequency of luminance pixels which are pixels acquiring luminance components, and then corrects the pixel signal output from a defective pixel out of the pixels that the sensor includes,
   wherein, during correction of a pixel signal of the color pixel, the correction processing unit performs correction referring to pixel signals of the luminance pixels having a spatial frequency higher than the spatial frequency of the color pixel.

(2) The signal processing device according to (1), wherein the correction processing unit includes a correction reference decision unit that decides a maximum value of the pixel signals of the luminance pixels that are located a one-pixel pitch away from the color pixel to be processed and of pixel signals of a pair of nearest same-color pixels which are color pixels having a same color that is located nearest to the color pixel to be processed among pixel signals of pixels within a predetermined range from the color pixel to be processed as a correction reference value that serves as a reference when the pixel signal of the color pixel to be processed is corrected.

(3) The signal processing device according to (1) or (2), wherein the correction reference value decision unit decides a maximum value of the pair of nearest same-color pixels as the correction reference value when all of the pixel signals of the luminance pixels within the predetermined range from the color pixel to be processed exceed the pixel signals of the nearest same-color pixels.

(4) The signal processing device according to any one of (1) to (3),
   wherein the correction processing unit further includes
   a luminance fluctuation width decision unit that decides a
      maximum value among an absolute value of a difference of the pixel signals of the pair of nearest same-color pixels, an increased amount of the plurality of luminance pixels disposed on one side of the color pixel to be processed, and an increased amount of the plurality of luminance pixels disposed on another side of the color pixel to be processed as a luminance fluctuation width, and a defect correction value computation unit that computes a defect correction value used to correct a pixel signal of the defective pixel by adding the luminance fluctuation width decided by the luminance fluctuation width decision unit to the correction reference value decided by the correction reference value decision unit.

(5) The signal processing device according to any one of (1) to (4),
wherein the correction processing unit further includes
a defect correction unit that performs correction by replacing the pixel signal of the color pixel to be processed with the defect correction value when the pixel signal of the color pixel to be processed has a value exceeding the defect correction value computed by the defect correction value computation unit.

(6) The signal processing device according to any one of (1) to (5), wherein the correction processing unit performs a defect correction process referring to a predetermined number of pixels disposed in line from the color pixel to be processed on the sensor.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-148608 filed in the Japan Patent Office on Jul. 2, 2012, the entire content of which is hereby incorporated by reference.

What is claimed is:

1. A signal processing device comprising a correction processing unit configured to (i) acquire pixel signals from a sensor on which pixels are disposed in an array in which a spatial frequency of color pixels of a first color which are pixels acquiring color components via first filters is lower than a spatial frequency of luminance pixels which are pixels acquiring luminance components via second filters, and (ii) correct a pixel signal from a defective pixel out of the pixels of the sensor, the correction processing unit including:
  (a) a correction reference decision unit configured to decide to use a maximum value of the pixel signals of the luminance pixels that are located one-pixel pitch away from the color pixel to be processed or a maximum value of the pixel signals of a pair of nearest color pixels of the first color among pixel signals of pixels within a predetermined range from the color pixel to be processed as a correction reference value that serves as a reference when the pixel signal of the color pixel to be processed is corrected,
  (b) a luminance fluctuation width decision unit configured to decide to use a maximum value among an absolute value of a difference of the pixel signals of the pair of nearest color pixels of the first color, an increased amount of the plurality of luminance pixels disposed on one side of the color pixel to be processed, and an increased amount of the plurality of luminance pixels disposed on another side of the color pixel to be processed as a luminance fluctuation width, and
  (c) a defect correction value computation unit configured to compute a defect correction value to correct the pixel signal of the defective pixel by adding the luminance fluctuation width decided by the luminance fluctuation width decision unit to the correction reference value decided by the correction reference value decision unit.

2. The signal processing device according to claim 1, wherein the correction reference value decision unit is configured to decide to use the maximum value of the pair of nearest color pixels of the first color as the correction reference value when all of the pixel signals of the luminance pixels within the predetermined range from the color pixel to be processed exceed the pixel signals of the nearest color pixels of the first color.

3. The signal processing device according to claim 1, wherein the correction processing unit further includes a defect correction unit configured to perform correction by replacing the pixel signal of the color pixel to be processed with the defect correction value when the pixel signal of the color pixel to be processed has a value exceeding the defect correction value computed by the defect correction value computation unit.

4. The signal processing device according to claim 1, wherein the correction processing unit is configured to perform a defect correction process by referring to a predetermined number of pixels disposed in a line with the color pixel to be processed on the sensor.

5. The solid-state image sensor of claim 1, wherein:
  the first filters are red filters, blue filters, or green filters; and
  the second filters are white filters or green filters.

6. A signal processing method comprising:
  acquiring pixel signals from a sensor on which pixels are disposed such that a spatial frequency of color pixels of a first color which are pixels acquiring color components via first filters is lower than a spatial frequency of luminance pixels which are pixels acquiring main components of luminance signals via second filters,
  deciding to use a maximum value of the pixel signals of the luminance pixels that are located one-pixel pitch away from the color pixel to be processed or a maximum value of the pixel signals of a pair of nearest color pixels of the first color among the pixel signals of pixels within a predetermined range from the color pixel to be processed as a correction reference value that serves as a reference when the pixel signal of the color pixel to be processed is corrected,
  deciding to use a maximum value among an absolute value of a difference of the pixel signals of the pair of nearest color pixels of the first color, an increased amount of the plurality of luminance pixels disposed on one side of the color pixel to be processed, and an increased amount of the plurality of luminance pixels disposed on another side of the color pixel to be processed as a luminance fluctuation width,
  computing a defect correction value to correct a pixel signal of a defective pixel by adding the luminance fluctuation width decided by the luminance fluctuation width decision unit to the correction reference value decided by the correction reference value decision unit, and and
  correcting the pixel signal from the defective pixel out of the pixels of the sensor.

7. A non-transitory computer readable medium having a computer program stored thereon, the computer program comprising a set of instructions that when executed causes a computer to implement a method for defective pixel correction, the method comprising:
  acquiring pixel signals from a sensor on which pixels are disposed in an array in which a spatial frequency of color pixels of a first color which are pixels acquiring color components via first filters is lower than a spatial frequency of luminance pixels which are pixels acquiring luminance components via second filters,
  deciding to use a maximum value of the pixel signals of the luminance pixels that are located one-pixel pitch away from the color pixel to be processed or a maximum value of pixel signals of a pair of nearest color pixels of the first color among pixel signals of pixels within a predetermined range from the color pixel to be processed as a correction reference value that serves as a reference when the pixel signal of the color pixel to be processed is corrected, deciding to use a maximum value among an absolute value of a difference of the pixel signals of the pair of nearest color pixels of the first color, an increased amount of the plurality of luminance pixels disposed on one side of the color pixel to be processed, and an increased amount of the plurality of luminance pixels disposed on another side of the color pixel to be processed as a luminance fluctuation width, computing a defect correction value to correct a pixel signal of a defective pixel by adding the luminance fluctuation width decided by the luminance fluctuation width decision unit to the correction reference value decided by the correction reference value decision unit, and correcting the pixel signal from the defective pixel out of the pixels of the sensor.

8. The non-transitory computer readable medium of claim 7, wherein:

the first filters are red filters, blue filters, or green filters; and the second filters are white filters or green filters.

9. A solid-state image sensor comprising:

a sensor on which pixels are disposed in an array in which a spatial frequency of color pixels of a first color which are pixels acquiring color components via first filters is lower than a spatial frequency of luminance pixels which are pixels acquiring luminance components via second filters; and a correction processing unit configured to acquire a pixel signal from the sensor and correct a pixel signal from a defective pixel out of the pixels of the sensor, wherein, the correction processing unit includes (a) a correction reference decision unit configured to decide to use a maximum value of the pixel signals of the luminance pixels that are located one-pixel pitch away from the color pixel to be processed or a maximum value of pixel signals of a pair of nearest color pixels of the first color among pixel signals of pixels within a predetermined range from the color pixel to be processed as a correction reference value that serves as a reference when the pixel signal of the color pixel to be processed is corrected, (b) a luminance fluctuation width decision unit configured to decide to use a maximum value among an absolute value of a difference of the pixel signals of the pair of nearest color pixels of the first color, an increased amount of the plurality of luminance pixels disposed on one side of the color pixel to be processed, and an increased amount of the plurality of luminance pixels disposed on another side of the color pixel to be processed as a luminance fluctuation width, and (c) a defect correction value computation unit configured to compute a defect correction value to correct the pixel signal of the defective pixel by adding the luminance fluctuation width decided by the luminance fluctuation width decision unit to the correction reference value decided by the correction reference value decision unit.

10. The solid-state image sensor of claim 9, wherein:

the first filters are red filters, blue filters, or green filters; and the second filters are white filters or green filters.

11. An electronic apparatus comprising:

a solid-state image sensor including a sensor on which pixels are disposed in an array in which a spatial frequency of color pixels of a first color which are pixels acquiring color components via first filters is lower than a spatial frequency of luminance pixels which are pixels acquiring luminance components via second filters, and a correction processing unit configured to Ea) acquire pixel signals from the sensor and correct a pixel signal output from a defective pixel out of the pixels of the sensor, wherein, the correction processing unit includes (a) a correction reference decision unit configured to decide to use a maximum value of the pixel signals of the luminance pixels that are located one-pixel pitch away from the color pixel to be processed and of pixel signals of a pair of nearest color pixels of the first color among pixel signals of pixels within a predetermined range from the color pixel to be processed as a correction reference value that serves as a reference when the pixel signal of the color pixel to be processed is corrected, (b) a luminance fluctuation width decision unit configured to decide to use a maximum value among an absolute value of a difference of the pixel signals of the pair of nearest color pixels of the first color, an increased amount of the plurality of luminance pixels disposed on one side of the color pixel to be processed, and an increased amount of the plurality of luminance pixels disposed on another side of the color pixel to be processed as a luminance fluctuation width, and (c) a defect correction value computation unit configured to compute a defect correction value to correct the pixel signal of the defective pixel by adding the luminance fluctuation width decided by the luminance fluctuation width decision unit to the correction reference value decided by the correction reference value decision unit.

12. The electronic apparatus of claim 11, wherein:

the first filters are red filters, blue filters, or green filters; and the second filters are white filters or green filters.

* * * * *